(12) United States Patent
Xiong et al.

(10) Patent No.: US 9,131,280 B2
(45) Date of Patent: Sep. 8, 2015

(54) CUSTOMIZING THE DISPLAY OF INFORMATION BY PARSING DESCRIPTIVE CLOSED CAPTION DATA

(71) Applicants: Sony Corporation, Tokyo (JP); Sony Network Entertainment International LLC, Los Angeles, CA (US)

(72) Inventors: True Xiong, San Diego, CA (US); Leo Pedlow, Ramona, CA (US)

(73) Assignees: SONY CORPORATION, Tokyo (JP); SONY NETWORK ENTERTAINMENT INTERNATIONAL LLC, Los Angeles, CA (US)

( * ) Notice: Subject to any disclaimer, the term of this patent is extended or adjusted under 35 U.S.C. 154(b) by 78 days.

(21) Appl. No.: 13/832,858

(22) Filed: Mar. 15, 2013

(65) Prior Publication Data

US 2014/0282711 A1    Sep. 18, 2014

(51) Int. Cl.
| | |
|---|---|
| *H04N 7/10* | (2006.01) |
| *H04N 7/025* | (2006.01) |
| *H04N 21/81* | (2011.01) |
| *H04N 21/485* | (2011.01) |
| *H04N 21/488* | (2011.01) |
| *H04N 21/45* | (2011.01) |
| *H04N 21/8543* | (2011.01) |

(52) U.S. Cl.
CPC ....... *H04N 21/8106* (2013.01); *H04N 21/4532* (2013.01); *H04N 21/4856* (2013.01); *H04N 21/4884* (2013.01); *H04N 21/8543* (2013.01)

(58) Field of Classification Search
None
See application file for complete search history.

(56) References Cited

U.S. PATENT DOCUMENTS

| | | | |
|---|---|---|---|
| 2005/0066357 A1* | 3/2005 | Ryal | 725/35 |
| 2006/0037038 A1* | 2/2006 | Buck | 725/9 |
| 2008/0141175 A1* | 6/2008 | Sarna et al. | 715/848 |
| 2010/0020234 A1* | 1/2010 | Smith et al. | 348/468 |
| 2012/0054664 A1* | 3/2012 | Dougall et al. | 715/772 |
| 2013/0002833 A1* | 1/2013 | Card, II | 348/51 |
| 2014/0111688 A1* | 4/2014 | Suvorov et al. | 348/500 |

* cited by examiner

*Primary Examiner* — Oschta Montoya
(74) *Attorney, Agent, or Firm* — Frommer Lawrence & Haug LLP; William S. Frommer

(57) ABSTRACT

The display of information supplied from a remote source is customized. Profile data identifying user preferences or display characteristics associated with a user's display device is transmitted to the remote source. Descriptive closed caption data disposed in a predetermined location in the data structure of the information is received from that remote source. The descriptive closed caption data is parsed from the received information; and the user's preference or display characteristic is recognized from the parsed data. The parsed data is used to control the user's display device, thereby displaying the supplied information in accordance with the user's preference or in accordance with the particular display characteristics of the user's display device.

15 Claims, 4 Drawing Sheets

FIG. 3

```xml
<?xml version="1.0" encoding="utf-8" ?>
<response sys_ver="7.11/109">
  <header version="01">
    <command>getContentinfoAPI</command>
    <code>0</code>
  </header>
  <    >
    <product id="CALLISTO">
      <playlist version="1.0">
        <entry>
          <source type="video">
                http://example.com/sampleclip.wmv
          </source>
          <title>Part 2: The Return</title>
          <skip errors>10</skip errors>
          <subtitle>
            <type>cc</type>
            <language id="en">
              <format>
                <smpte-tt profile="[  ]" level="1.0">
                http://example.com/video/cat/x/smpte-tt.xml
                </smpte-tt>
              </format>
            </language>
          </subtitle>
        </entry>
      </playlist>
    </product>
  </sony>
</response>
```

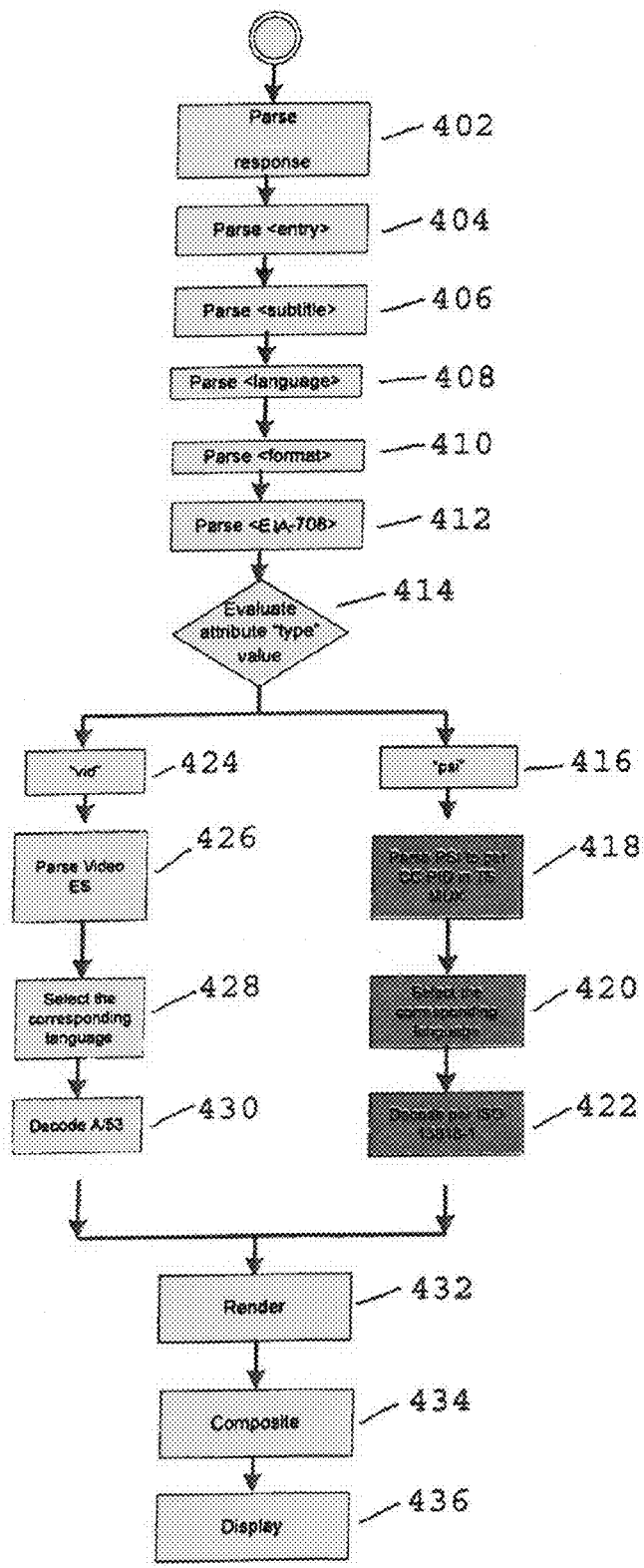

CUSTOMIZING THE DISPLAY OF INFORMATION BY PARSING DESCRIPTIVE CLOSED CAPTION DATA

FIELD OF THE INVENTION

This invention relates to customizing information, such as content, supplied to a user's display device from a remote source; and, more particularly, to using descriptive closed caption data from the source to display information in a form or format that is particular to the preferences or characteristics of the user.

BACKGROUND OF THE INVENTION

Information supplied from a source, such as content supplied from a content provider, generally is limited in the form and format selected by the provider. For example, content may be supplied along with subtitles or closed caption information as may be transmitted by the content provider. Video content may be supplied with dubbed audio information in selected languages as may be chosen by the content provider. The Federal Communications Commission (FCC) has mandated the transmission of content along with closed caption information in particular languages. While this has significantly enlarged the audience that appreciates such content and has improved the entertainment experience of members of that audience, there remains a substantial portion of the population that will not fully enjoy such content. For example, individuals who are visually or auditorily impaired might not experience fully satisfactory entertainment enjoyment, even with such closed caption information currently being transmitted.

OBJECTS OF THE INVENTION

Accordingly, it is an object of the present invention to provide a better entertainment experience to individuals suffering from physiological impairments.

It is another object of this invention to provide a large amount of entertainment-enhancing information and data in the FCC-mandated closed caption slot of content that is transmitted via terrestrial, satellite, cable or Internet delivery.

A further object of this invention is to parse the hierarchical data structure that may be present in the closed caption slot of content, in order to detect particular information consistent with a user's profile data.

Yet another object of this invention is to provide technical solutions for individuals having different accessibility needs and requirements to enable those individuals to enjoy content in a form and/or format that conforms to predetermined display characteristics of the individual's display device.

A further object of this invention is to transmit from a user information associated with the user's device, which information can be used to change, for example in real time, the particular information (e.g. closed caption or subtitle information) used by the device to display such particular information in accordance with the user's needs or preferences.

A still further object of this invention is to automatically update a user's profile data, which identifies the user preferences or display parameters, when the user changes display devices, thereby sending to the user content and related information that is customized to the updated user profile.

Various other objects, advantages and features of the present invention will become readily apparent from the ensuing detailed description, and the novel features will be particularly pointed out in the appended claims.

SUMMARY OF THE INVENTION

In accordance with this invention, the display of information supplied from a remote source is customized. Profile data identifying the user preferences or display characteristics associated with a user's display device is transmitted to the remote source; and descriptive closed caption data is received from that remote source. The descriptive closed caption data is disposed in a predetermined location in the data structure of the information supplied from the source. The descriptive closed caption data is parsed from the received information; and the user's preference or display characteristic is recognized from the parsed data. The parsed data is used to control the user's display device, thereby displaying the supplied information in accordance with the user's preference or in accordance with the particular display characteristics of the user's display device.

BRIEF DESCRIPTION OF THE DRAWINGS

The following detailed description will best be understood in conjunction with the accompanying drawings in which:

FIG. 3 is an illustration of the data structure of information supplied to a user from a source of content; and FIG. 4 is a flowchart illustrating an implementation of the parsing feature in accordance with an embodiment of the present invention.

DETAILED DESCRIPTION

Figure 1:
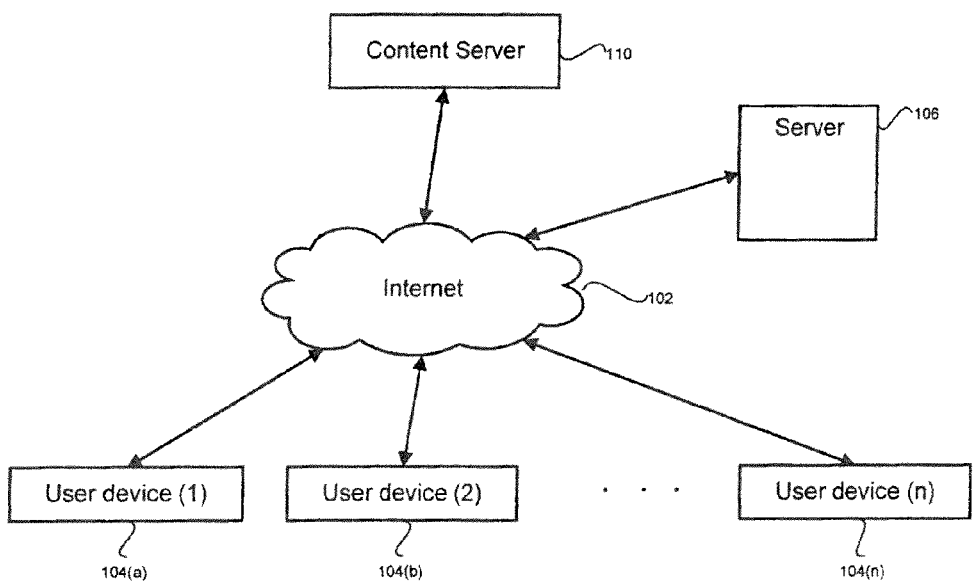
FIG. 1 is an overall block diagram of a system in which the present invention finds ready application.

Turning now to FIG. 1, there is illustrated a block diagram of system 100 which incorporates the present invention. System 100 includes a content server 110 adapted to supply information in the form of entertainment content, such as a movie, a television show, audio entertainment, or the like, to remote users via a network 102. Network 102 may be private Internet Protocol (IP) networks, as well as public IP networks, such as the Internet. The network may be a wired network or a wireless network, as are known to those of ordinary skill in the art. User devices 104 are coupled to network 102 and are adapted to receive information from content server 110. Additionally, and as will be described, user devices are adapted to send, via network 102, profile data that identifies the user's preferences by which content supplied from content server 110 is displayed at the user's device. As used herein, the display of content refers to visual or audible display; and may also refer to tactile display, such as braille for individuals that may be visually and auditorily impaired.

Content server 110 supplies to user devices 104 via network 102 descriptive closed caption data that is used to establish the form and/or format by which the content supplied from content server 110 is displayed at the user's device. In the preferred embodiment described herein, the descriptive closed caption data is disposed in the FCC-mandated closed caption slot, such as set out in the EIA-608 and EIA-708 standards. The descriptive closed caption data used by the present invention is described below.

System 100 also may be provided with a server 106 that receives the user's profile data and supplies to the user the descriptive closed caption data synchronized with the content provided by content server 110. As a result, the user device 104 displays the content from content server 110 with additional information from server 106 as determined by the user's profile data.

Examples of the operation of system 100 now will be described. User device 104 may be operated by the user to generate and transmit profile data via network 102 to content server 110 and, if provided, the server 106. The profile data identifies, for example, a particular subtitle or closed caption language preferred by the user, to be displayed on user device 104. As another example, the profile data may identify a particular audible language to be generated at user device 104. It will be appreciated, the display of textual information as subtitles or closed caption information is intended to assist the user that is not conversant in the particular language used in the content, or who may be auditorily impaired; and the audible "display," which may be dubbed into the visually displayed content is intended to assist the user who is not conversant in the language of that content, or may be visually impaired. Other examples of profile data include:

- identifying the ability of the user device 104 to receive and display closed caption textual information;
- identifying the ability of the user device 104 to receive and display closed caption graphical information;
- identifying the preference of the user to receive explanatory closed caption information that provides a description of the background information that otherwise would not be perceived by a physiologically impaired user;
- identifying the particular location and size of textual information that is overlaid on the user's display device 104, such as the device used by a visually impaired individual;
- identifying the particular format in which closed caption information is displayed;
- identifying particular display characteristics of the user device 104, such as the sound generating characteristics of the device, size of the visual display device, 3-D capabilities of the user device, and the like.

In another embodiment, if the user does not generate profile data to the server, a default profile may be generated by content server 110 or server 106 based on the geographic region (e.g. country) in which the user's device is located, language of that country, language of content (e.g. video programs) that had been selected previously by the user, and the like. Textual information may be transmitted to the user device as a function of such default profile; and in a variation of this embodiment, the textual information may be in the language most used in this region.

As yet another embodiment, closed caption information and/or subtitle information may be generated based upon the user's preferences, as may be collected at the server from the viewer's history of viewing content, downloading content, playing multimedia devices, and the like.

The profile data transmitted by the user device may be associated with that device such that a regeneration of profile data need not be transmitted each time the user device is connected to network 102. Rather, the profile update may be stored at content server 110 or at server 106 and associated with the user device 104 such that when the user device is connected to network 102 and identified by the server, the profile data associated with that user device is automatically retrieved.

When a user wishes to enjoy information, such as content, supplied from content server 110, a request for content may be transmitted from user device 104. This request for content may include the user's profile data; or, alternatively, simply may identify the user device to enable automatic retrieval of the user's profile data. The content requested by the user is transmitted from, for example, content server 110 to user device 104 via network 102. The content may be transmitted in digital form and includes the data structure established by the content server, for example, the data structure that conforms to the ATSC standard. The data structure includes a closed caption slot into which the content server disposes the descriptive closed caption data mentioned above. Alternatively, the descriptive closed caption data, which nevertheless conforms to the user's profile data, may be supplied from server 106 to user device 104.

The user device includes a programmed processor that parses the descriptive closed caption data from the received data content. The user's preference or the display characteristics of the user device 104 is recognized from the parsed descriptive closed caption data; and the user device 104 is controlled in accordance with the user's preference and/or device display characteristics. For example, if the user's profile data identifies textual subtitles, the content from content server 110 is displayed on user device 104 with subtitles. If the user's profile data identifies subtitles to be displayed in, for example, Spanish, and if subtitles for the content from the content server are available in Spanish, the content from content server 110 is displayed on user device 104 with Spanish subtitles. If the user's profile data identifies a particular format in which subtitle text is to be displayed on the user's display device, the subtitle text from content server 110, or from server 106, as the case may be, is displayed on user device 104 in that format, as specified by the parsed descriptive closed caption data.

As another example, if the user's profile data identifies audio information in, for example, French, and if the content from content server 110 is available with French audio information, the content from the content server is displayed on user device 104 dubbed in French. If the user's profile data identifies explanatory textual information, the content from content server 110 is displayed on the user device, for example, a video scene is displayed, with textual information that explains or describes the environment of that scene. This is particularly helpful if the user is auditorily impaired.

If the descriptive closed caption data includes both textual and graphic display information; and if the user's display device is capable of displaying only textual information, display device 104 parses the textual information from the received data content and ignores the graphic display information. Alternatively, the textual information is ignored and the graphic display information is parsed from the received data content if the user's display device is capable of displaying only graphic information.

As another example, user device 104 may be a media player, such as a DVD player. Profile data associated with that media player may identify a particular language in which subtitles are to be displayed, or a particular language in which the audio portion of the content is to be reproduce from the medium. In this example, consistent with that profile data, server 106 supplies to the user's display device descriptive closed caption data that contains the identified subtitle language or audio portion of the content being reproduced from the medium.

Figure 2:
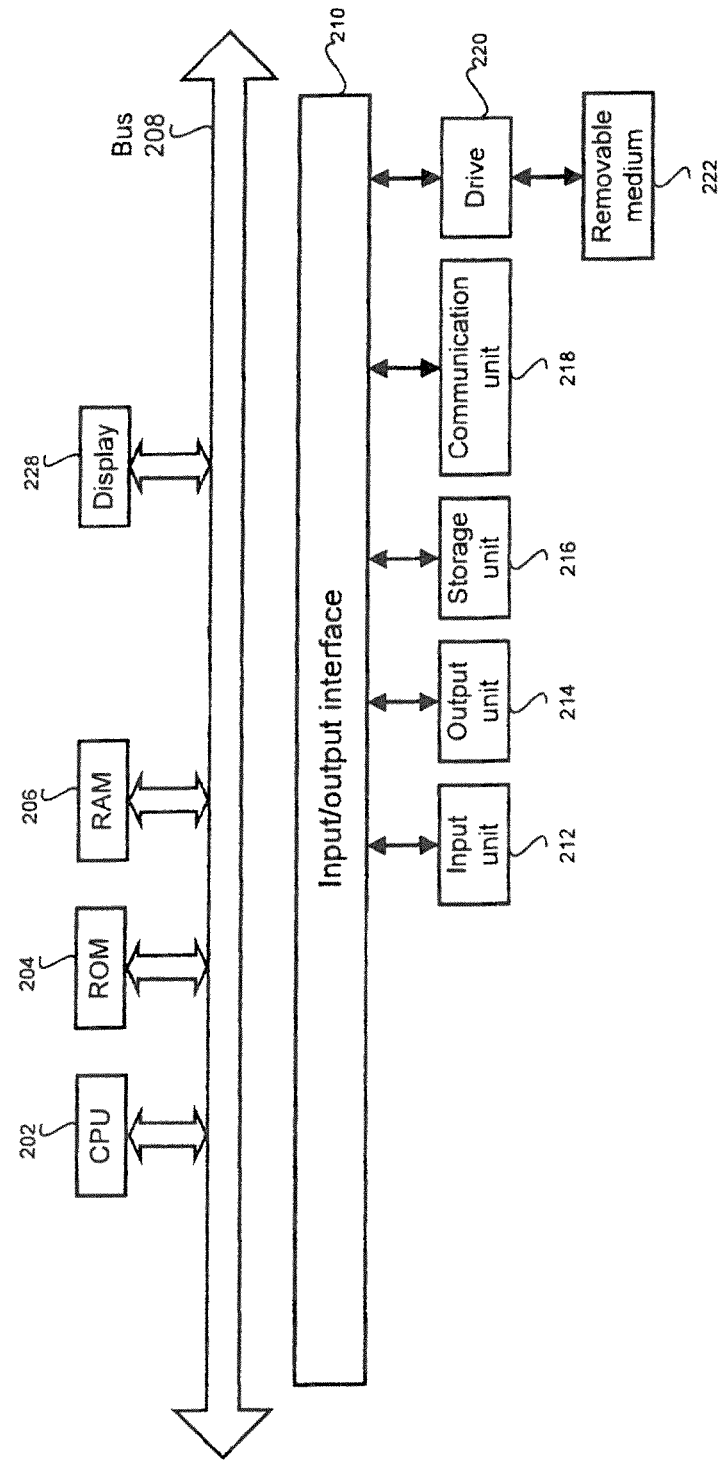
FIG. 2 is a block diagram of one implementation of a user's display device that incorporates the present invention.

An embodiment of a user device 104 is illustrated in the block diagram of FIG. 2. One example of the user device is an Internet Protocol Television (IPTV), although other display devices capable of communicating with content server 110 or server 106 via network 102 may embody user device 104. In the illustrated embodiment, the user device includes a CPU 202, a ROM 204, a RAM 206, a bus 208, an input/output interface 210, an input unit 212, an output unit 214, a storage unit 216, a communication unit 218, a drive 220, a removable medium 222, and a display 228. Although not shown, the user device also may include biometric sensors for sensing and supplying to server 110 or server 106 biometric data derived from the user, thereby identifying the user and the user's profile data.

The CPU 202, the ROM 204, and the RAM 206 are interconnected to one another via the bus 208, and the input/output interface 210 is also connected to the bus 208. In addition to the bus 208, the input unit 212, the output unit 214, the storage unit 216, the communication unit 218, and the drive 220 are connected to the input/output interface 210. The CPU 202 executes various kinds of processing in accordance with a program stored in the ROM 204 or in accordance with a program loaded into the RAM 206 from the storage unit 216 via the input/output interface 210 and the bus 208. The ROM 204 has stored therein a program to be executed by the CPU 202. The RAM 206 stores as appropriate a program to be executed by the CPU 202, and data necessary for the CPU 202 to execute various kinds of processing. The input unit 212 includes a keyboard, a mouse, a microphone, and the like. When the input unit 212 is operated by the user, the input unit 212 supplies an input signal based on the operation to the CPU 202 via the input/output interface 210 and the bus 208. The input unit is operated by the user to assist in generating the user's profile data. The output unit 214 includes a display, such as a CRT (Cathode Ray Tube) or an LCD, a speaker, and the like. The storage unit 216 includes a hard disk, a flash memory, and the like, and stores a program executed by the CPU 202, as well as data transmitted to the server 110 or server 106 via network 102. A removable medium 222 may be, for example a magnetic disk, an optical disc, a magneto-optical disc, or a semiconductor memory, which may be loaded as appropriate into the drive 220. The drive 220 reads data recorded on the removable medium 222 or records predetermined data on the removable medium 222. The display 228 may be part of the output unit 214 or may be an additional display unit. The communication unit 218 includes a modem, a terminal adaptor, and other communication interfaces, and performs a communication process via the network of FIG. 1.

Referring now to the data structure illustrated in FIG. 3, there is illustrated one embodiment of the data structure included in the closed caption slot consistent with, for example, the EIA-708 standard. It will be appreciated that similar data structures may be provided in other locations of digital data transmitted to users from content servers via network 102. This data structure is transmitted from content server 110 or server 106 in response to a user request for content; and includes particular information consistent with and requested by the user's profile data. This hierarchical data structure may be communicated in XML as part of the overall response. It is appreciated, this hierarchical data structure may be communicated in other known formats, such as JSON, YAML, etc.

The illustrated data structure identifies the user's device as the tag <product ID>. This tag may be supplied with the user's profile data; or may be generated automatically at server 110 or server 106 in response to identifying data supplied to the server from the user device via network 102. The tag <entry> identifies the content being supplied to the user device 104. The tag <subtitle> within <entry> identifies the asset referenced in <entry> as containing subtitle information. The asset here is content, such as video, still image, audio or the like information; and the subtitle information of <subtitle> identifies the descriptive closed caption data included in the data structure as subtitle data. Within the <subtitle> tag is the identification of the language of that subtitle, as indicated by <language>. In this example, the identified <language> is English.

The tag <type> within the <subtitle> tag identifies the particular type of subtitle that will be displayed. For example, the subtitle may be displayed as textual or graphic characters, dubbed audio sounds, braille, or other displayable information. One example of displaying braille characters is a so-called moving braille device, such as a braille-type tablet that displays moving braille that moves in synchronism with the content supplied from content server 110. The enumeration "cc" in the tag <type> represents a text-based closed captioning stream that complies with the applicable portions of the EIA-608 or EIA-708 standard. The user device 104 that conforms to this standard displays the subtitle data as closed captioning information in accordance with such standard.

The tag <language> within the <subtitle> tag identifies the specific language of the subtitle. Recall, the subtitle may be textual or graphic information (or a combination of both textual and graphic information), audio information, or other displayable information; and this tag <language> identifies the language in which that information is displayed. As mentioned above, in this example, the language of the subtitle or other displayable information is English. The tag <format> identifies the particular format in which the subtitle is to be displayed. In the illustrated example, the format of the subtitle is the standard SMPTE-TT format. As other examples, the format of the subtitle may be SAMI, SRT, WebVTT, etc. Of course, depending upon the format by which the user device 104 may display the descriptive closed caption data, the <format> tag identifies that display format. If the user upgrades or changes display device 104 so as to change the display format of the descriptive closed caption data, the <format> tag may be similarly changed such that the user's display device is instructed to be compatible with the format in which the closed caption data is to be displayed.

Thus, the illustrative data structure shown in FIG. 3, when properly parsed (as will be described below) controls the user's display device to display subtitle, explanatory, audio or other displayable information in accordance with the user's preference and in accordance with the display characteristics of the user's device.

Turning now to the flowchart illustrated in FIG. 4, this flowchart describes the method by which user device 104 parses the descriptive closed caption data from the information received from content server 110 or server 106. It will be appreciated, this method may be implemented by a programmed processor.

Prior to receiving information from, for example, the content server, user device 104 is operated to transmit to the server a request for content. The user device also may transmit to the server the profile data associated with the user's display device. This profile data may be transmitted prior to or along with the user's request for content. In one embodiment, this profile data is stored at content server 110 or server 106 and is accessed in response to the identification of the user or the user device 104 that may be transmitted with the user's request for content. Commencing with step 402, the user device receives information from the server, such as the information represented by the data structure shown in FIG. 3 and disposed in the closed caption slot of the data transmitted by the server. This information is in the form of packets multiplexed into the transport stream normally used in the transmission of digital video information, and is in response to the user's request for content. This response is parsed from the received information.

The data associated with the <entry> tag in the received information is parsed from the data structure, as represented by step 404, and as represented by step 406 the data associated with the <subtitle> tag is parsed from the data structure. Continuing with the flowchart of FIG. 4, the <language> data is parsed from the data structure, as represented by step 408; and the <format> data is parsed from the received data structure. Since the data transmitted by content server 110 and server 106 is compliant with the EIA-708 standard, data associated with the <EIA-708> tag (not shown in FIG. 3) is parsed from the received data structure.

Consistent with the EIA-708 standard, closed caption data may be displayed at the user's display device either in textual format, identified as the "psi" attribute, or in graphical format, identified as the "vid" attribute. Inquiry 414 is made to evaluate the attribute of the closed caption data, that is, to determine whether the received closed captioned data exhibits the "psi" or "vid" attribute, thereby identifying the format in which the closed caption data is to be displayed. If the attribute of the closed caption data is determined to be "psi," the flow chart proceeds to step 416; and in step 418 the data structure is parsed to detect the closed caption packet identifier in the multiplexed transport stream.

The language identification that had been parsed from the data structure in step 408 is used in step 420 to select the identified language from all the subtitles in all the languages that are transmitted from the server. Closed caption textual information, for example subtitles, in this selected language is retrieved from the data structure shown in FIG. 3, and is decoded in step 422 consistent with the ISO 13818-1 standard. The decoded textual information in this selected language is suitably rendered in step 432, combined with the received content to form a composite image in step 434, and displayed on the user's display device, as represented by step 436.

If inquiry 414 determines that the attribute of the closed caption data is "vid," the flow chart proceeds from inquiry 414 to step 424; and in step 426 the data structure is parsed to extract the graphical video information from the multiplexed packets included in the elementary stream (ES). For example, the packet identifier in the packets containing graphical video information in the data structure are detected.

The language identification that had been parsed from the data structure in step 408 is used in step 428 to select the identified language from all the graphical information in all the languages that are transmitted from the server. Graphical information in this selected language is retrieved from the data structure shown in FIG. 3 and is decoded in step 430 consistent with the ATSC A/53 standard. The decoded graphical information is rendered in step 432, combined with the received content in step 434 to form a composite image, and displayed, in step 436, on the user's display device.

A "truth table" reflecting the operation of inquiry 414 and steps 416-422 on the one hand and steps 424-430 on the other may be summarized as follows:

| <CEA-208> attribute type | Parse Video ES | Parse PSI | Apply language settings | Decode A/53 [30] | Decode per 150/IEC 13818-1 [14] |
|---|---|---|---|---|---|
| vid graphics | true | false | true | true | false |
| psi textual | false | true | true | false | true |

Examples of customizing information supplied to a user's display device from content server 110 or server 106 now follow. If the user is visually impaired, profile data sent to the server from the user device may identify audible sounds (e.g. speech) in a particular language as the user's preference. Consequently, the descriptive closed caption data transmitted from the server and associated with, for example, a program to be displayed includes speech data in that language, thereby controlling the user's display device, such as a sound generator, an Internet-connected radio, a multimedia player, or the like, to generate sound in the identified language. As another example, the profile data may identify braille as the user's preference. In that case, the received descriptive closed caption data includes characters in braille format; and if the user's display device is a movable braille reader, that reader is controlled to generate corresponding characters in braille.

As another example, the user's profile data may represent the user's preference for the display of textual subtitles in a particular language. If those subtitles in that language are available for the particular content requested by the user, the descriptive closed caption data received by the user device includes textual information in that language. Such textual information is displayed as subtitles on the user's display device in the format identified by the profile data, compatible with the display characteristics of the user's device. If the user's device is, for example, an Internet protocol television (IPTV), the operating characteristics of that device will be communicated via network 102 and, thus, known to the server, whereby information transmitted from the server will be compatible with and matched to that device.

As yet a further example, the user's profile data may identify the user as being auditorily impaired and may include data identifying the user's preference to receive explanatory textual information. As a result, the closed caption data transmitted from, for example, content server 110 may include such textual data that explains the audible environment of, for instance, a video scene, such as a subtitle that states "explosion" or "engine roar" or the like.

Examples of the user's display device include optical disc players, internet-connected television receivers, personal computers, peripheral devices, communication devices (e.g. smartphones, PDA's, and the like), blue-tooth connected devices, HDMI devices, 3-D glasses, and digital accessories. The identity and display characteristics of the user's device are included in the profile data sent from that device; and the descriptive closed caption data transmitted from the server, or other remote source of content, is compatible with the user's display device as determined by the profile data.

As mentioned above, the user's profile data may be updated automatically when the user selects a new or different display device with which to display content. For example, if the user obtains or selects a new multimedia display device, such as one or more of those referred to in the preceding paragraph, the user's profile data is updated automatically and in real time to identify that new device and/or the display characteristics associated with that new device. Consequently, the descriptive closed caption data transmitted to the user from the server will be compatible with that new device.

In one embodiment, the user can transmit to the server a command that "turns off" the request for descriptive closed caption data that otherwise is present in the user's profile data. The server responds to this command by not transmitting closed caption data to the user until that command is modified, or until revised profile data is sent to the server.

One use that may be realized from the invention described herein is the ability to provide updated or upgraded software in the closed caption slot transmitted from the server. The updated software is parsed at the user's device to modify the ability of that device to recognize and upgrade to new or improved formats. Thus, updates may be effected in user devices without the need for physical replacement of hardware. Conversely, the format of the closed caption data that is transmitted from the server may be revised to be compatible with the format abilities of the user's device by sending to the server profile data that identifies updated formatting of the user device.

While the present invention has been particularly shown and described in connection with preferred embodiments, and while various alternatives and examples have been disclosed, it should be readily appreciated to those of ordinary skill in the art that various other changes and modifications may be made without departing from the spirit and scope of the invention. The appended claims are intended to encompass the embodiments described, as well as such other changes and modifications as will become apparent.

What is claimed is:

1. A method of customizing the display of information supplied from a remote source and exhibiting a data structure, comprising:
   transmitting to the remote source profile data associated with a user's display device identifying predetermined display characteristics of the user's display device, including display format, of the user's display device;
   receiving from said remote source descriptive closed caption data disposed in a predetermined location in the data structure of the supplied information, the descriptive closed caption data including subtitle textual information representing subtitle text in plural different languages, the descriptive closed caption data identifying a display format that is adaptable to match the format of the user's display device identified by the display format included in the profile data;
   parsing from the received information said descriptive closed caption data;
   recognizing a predetermined display characteristic in the parsed data;
   selecting from the received descriptive closed caption data one of said different languages corresponding to a particular language identified by a user preference in the profile data transmitted to the remote source; and
   controlling a user's display device with said parsed data to display the subtitle text in the selected language in a predetermined format at a predetermined location in accordance with the predetermined display characteristic of the user's display device.

2. The method of claim 1, wherein the descriptive closed caption data is audio information in the selected language identified by the user preference.

3. The method of claim 2, wherein the user's display device is controlled to generate audio sounds corresponding to the audio information and dubbed into the information displayed at the user's display device.

4. The method of claim 1, wherein the descriptive closed caption data includes audio information that describes an environment of the information displayed at the user's display device.

5. The method of claim 4, wherein the displayed information is a video scene.

6. The method of claim 1, wherein the descriptive closed caption data includes both textual and graphic display information; and wherein the user's display device is controlled to display text or graphics, corresponding to the predetermined display capabilities of the user's display device.

7. The method of claim 1, wherein the predetermined location in the data structure in which the descriptive closed caption data is disposed is a closed caption slot mandated by the FCC.

8. The method of claim 1, wherein the profile data associated with the user's display device is updated automatically when the user changes the display device so as to identify display characteristics of the changed display device.

9. A customizable display device for displaying information supplied from a remote source in a data structure, comprising:
   a transmitter unit configured to transmit to the remote source profile data associated with the display device identifying predetermined display characteristics of the user's display device, including display format, of the user's display;
   a receiver unit configured to receive from said remote source descriptive closed caption data disposed in a predetermined location in the data structure of the supplied information, the descriptive closed caption data including subtitle textual information representing subtitle text in plural different languages, the descriptive closed caption data identifying a display format that is adaptable to match the format of the user's display device identified by the display format included in the profile data;
   a parsing unit configured to parse from the received information said descriptive closed caption data;
   an identifying unit configured to recognize a predetermined display characteristic in the parsed data;
   a selecting unit configured to select from the received descriptive closed caption data one of the different languages corresponding to a particular language identified by a user preference in the profile data transmitted to the remote source; and
   a controller configured to control the display device with said parsed data to display the subtitle text in the selected language in a predetermined format at a predetermined location in accordance with the predetermined display characteristic of the display device.

10. The device of claim 9, wherein the descriptive closed caption data is audio information in the selected language identified by the user preference.

11. The device of claim 10, wherein the controller is configured to control the display device to generate audio sounds corresponding to the audio information and dubbed into the information displayed at the display device.

12. The device of claim 9, wherein the descriptive closed caption data includes audio information that describes an environment of the information displayed by the display device.

13. The device of claim 12, wherein the displayed information is a video scene.

14. The device of claim 9, wherein the descriptive closed caption data includes both textual and graphic display information; and wherein the controller is configured to control the display device to display text or graphics, corresponding to the predetermined display capabilities of the display device.

15. The device of claim 9, wherein the predetermined location in the data structure in which the descriptive closed caption data is disposed is a closed caption slot mandated by the FCC.

* * * * *